(12) United States Patent
Mendoza (10) Patent No.: US 7,512,291 B2
(45) Date of Patent: Mar. 31, 2009

(54) FIBER BRAGG CRATING SENSOR INTERROGATION METHOD

(76) Inventor: Edgar A. Mendoza, 2803 Faber St., Redondo Beach, CA (US) 90278

( * ) Notice: Subject to any disclaimer, the term of this patent is extended or adjusted under 35 U.S.C. 154(b) by 0 days.

(21) Appl. No.: 11/443,618

(22) Filed: May 31, 2006

(65) Prior Publication Data

US 2007/0280601 A1 Dec. 6, 2007

(51) Int. Cl.
  G02B 6/00 (2006.01)
  G02F 1/295 (2006.01)
  G02B 6/26 (2006.01)
  G02B 6/34 (2006.01)
  G02B 6/36 (2006.01)

(52) U.S. Cl. .............. 385/12; 385/10; 385/13; 385/14; 385/15; 385/37; 385/43; 385/88

(58) Field of Classification Search .......... 385/10, 385/12, 13, 14, 37; 398/9, 13, 14, 22, 23, 398/33, 34, 43, 46, 68, 74, 84, 85
See application file for complete search history.

(56) References Cited

U.S. PATENT DOCUMENTS 5,675,674 A * 10/1997 Weis ......................... 385/12
5,680,489 A * 10/1997 Kersey ...................... 385/12
5,748,312 A * 5/1998 Kersey et al. .............. 356/478
5,973,317 A * 10/1999 Hay ..................... 250/227.14
6,204,920 B1 * 3/2001 Ellerbrock et al. ......... 356/477
6,233,373 B1 * 5/2001 Askins et al. ............... 385/12
6,252,689 B1 * 6/2001 Sharp ....................... 398/168
6,871,244 B1 * 3/2005 Cahill et al. ................ 710/62
6,930,820 B1 * 8/2005 Shooks et al. .............. 359/325
2002/0028034 A1 * 3/2002 Chen et al. .................. 385/12
2003/0156272 A1 * 8/2003 Cytron et al. ................ 356/28

OTHER PUBLICATIONS

Sunaga et al. ("2 Gbit/s Small Form Factor Fiber-Optic Transceiver for Single Mode Optical Fiber," 1999, IEEE, 1999 Electronic Components and Technology Conference, pp. 549-553).*
Norman et al. ("Interferometric Sensor Interrogation Using an Arrayed Waveguide Grating," IEEE Photonics Technology Letters, vol. 17, No. 1, Jan. 2005).*

* cited by examiner

Primary Examiner—Brian Healy
Assistant Examiner—Hung Lam
(74) Attorney, Agent, or Firm—Howard R. Popper (57) ABSTRACT

The invention discloses multi-channel fiber Bragg grating (FBG) interrogation systems and manufacture thereof. The multi-channel fiber Bragg-grating sensor interrogation unit comprises at least one integrated optic sensor microchip and a signal processing IC-electronics unit in a miniaturized, telecommunications standard, hermetically sealed 2-cm×5-cm SFF single fiber package.

12 Claims, 10 Drawing Sheets

100GHz40ch Flat Athermal AWG
Insertion Loss: 5dB (Typical)
Adjacent Crosstalk: -30dB (Typical)

FIBER BRAGG CRATING SENSOR INTERROGATION METHOD

This application is related to application Ser. No. 11/443,560 filed contemporaneously herewith on Mar. 31, 2006.

FIELD OF THE INVENTION

The invention relates generally to the fields of fiber optic structural health monitors and, more particularly, to multi-channel fiber Bragg grating (FBG) interrogation systems and manufacture thereof.

BACKGROUND OF THE INVENTION

Conventional state-of-the-art fiber Bragg grating (FBG) interrogation systems are typically bulky and heavy bench-top instruments that are assembled from off-the-shelf fiber optic and optical components integrated with a signal electronics board into an instrument console. The most basic FBG interrogation system uses a high-resolution near-infrared spectrometer, such as a telecommunications grade optical spectrum analyzer, in conjunction with a broadband light source, such as a white light fiber source, to interrogate the status of the FBG sensors. This type of system, although very accurate in terms of determining the peak wavelength position of the grating, is relatively slow in terms of signal acquisition.

More sophisticated and faster scanning FBG interrogators use either tunable laser (swept wavelength) systems or scanning Etalon interferometers, such as the systems developed by Micron Optics (Atlanta, Ga.). The Micron Optics wavelength scanning systems come in a variety of models with sub-picometer peak wavelength resolution, broad-spectrum (~80 nm) capability, but with a relatively slow-scan, data acquisition rate typically from 1 Hz to 250 Hz. FBG interrogators with faster data acquisition rates are available such as the FiberPro2 from Luna Innovations (Roanoke, Va.), operating at data sampling rates of 1 kHz; the HS-FOIS produced by AEDP (Lanham, Md.) with data rates of up to 3.5 kHz; the I*Sense systems produced by IFOS (Santa Clara, Calif.) with data rates of up to 5 kHz; and the FBG read-out systems from Blue Road Research (Gresham, Oreg.) with data rates of up to 2 MHz.

The earliest fiber Bragg grating sensor work was performed by Morey and Meltz (SPIE Distributed and Multiplexed Fiber Optic Sensors, Vol. 1586, 1991; SPIE Chemical, Biochemical, and Environmental Fiber Sensors III, Vol. 1587, p. 351, 1991) at United Technologies. Since those early days, United Technologies has abandoned the field and fiber Bragg grating technology has blossomed in other hands into a key technology for telecommunications and sensing. The U.S. Naval Research Laboratory (ISA 0227-7576/97/747-756, Orlando, Fla., 1997) has been a leading research organization in fiber Bragg gratings for sensing applications. Its personnel have been responsible for many advances in fiber Bragg grating technology, including on-line fiber grating writing, but their primary emphasis has been on developing multiplexing and detection methods. Eric Udd of Blue Road Research has been a leader in the field of fiber optic smart aircraft structures since the early 1970s by developing many fiber optic technologies including fiber sensor gratings that can be used for the NDE assessment of aircraft structures. (SPIE, Smart Structures and Materials, Vol. 3330, p. 12-16, 1998).

Other research groups in the field include one at Virginia Polytechnic (SPIE, Smart Structures and Materials, Vol. 3330, p. 231-236, 1998) associated with Luna Innovations, that primarily has been investigating photo-induced, long-period gratings. Long-period gratings have minimal back reflection and must be used in a transmission mode, so the detection system must be double-ended and therefore more complex. To date, virtually all published work on FBG structural sensor systems has been focused on the detection of static strains or low-frequency (<5 kHz) vibrations (1998 Pacific Northwest Fiber Optic Sensor Workshop, Udd, E., (Ed.) Session 3, Paper No. 2, May 1998). Although complex FBG sensor systems have been developed, they rely on the use of off-the-shelf instrumentation that is typically very expensive. As a result, these systems remain in use in laboratory settings. The simplest of the FBG sensors available on the market today is a single point strain detection system, which sells for $8500 by Blue Road Research.

Therefore, there is a great need for a combined fiber Bragg grating interrogation with transceiver system representing a new, highly-robust, and reliable, technology that can be used to accurately monitor the status of an array of distributed fiber optic Bragg grating sensors installed in critical infrastructures.

SUMMARY OF THE INVENTION

Some aspects of the invention provide a single channel or multi-channel fiber Bragg-grating sensor interrogation unit, comprised of at least one integrated optic sensor microchip and a signal processing IC-electronics unit in a miniaturized, telecommunications-standard, hermetically-sealed 2-cm×5-cm small form factor (SFF) single fiber package.

In one embodiment, the integrated optic sensor microchip is configured as an optical bench to integrate functionalities of more than one optoelectronics component, wherein the optoelectronics component is selected from the group consisting of light guides, splitters and couplers, light sources, photodetectors, WDM filters, tapered waveguide Bragg grating (TWBG) filters, and FBG sensor signal demodulators. In another embodiment, the integrated optic sensor microchip incorporates one waveguide port for a fiber input/output of the microchip configured for a bi-directional transmission of signals back and forth from an FBG sensor to the microchip. In still another embodiment, the integrated optic sensor microchip uses a principle of wavelength division demultiplexing to separate each of the wavelength encoded FBG sensor signals and to interrogate the status of each of individual sensor in an array of FBG transducers distributed along a single optical fiber in real time.

In a preferred embodiment, the sensor interrogation unit of the present invention further comprises a WDM interference filter, in which a wavelength encoded optical signature of each FBG transducers in the array is transformed to an electric signal at each of photo receivers by means of selected bandpass optical properties of the interference filter. In one embodiment, the unit is configured to operate in the 1520-nm to 1570-nm wavelength range. In another embodiment, the unit has a spectral wavelength resolution of better than 5-pm. In still another embodiment, the data acquisition rate of the unit is at a rate ranging from DC to 20 kHz. One aspect of the invention provides the data acquisition rate of the unit at a rate ranging from 20 kHz to 5 MHz frequencies.

The sensor interrogation unit comprises an interference filter with the selected spectral optical bandpass properties that tracks the FBG peak wavelength shift and converts the wavelength encoded optical signal from each of the FBG sensors into a linear intensity variation that is directly related to a peak wavelength position of the sensor grating at a photodetector element.

In some embodiments, input parameters of the integrated optic sensor microchip is selected from the group consisting of an environmentally induced wavelength shift of an active peak wavelength of the FBG transducer, associated with changes in stress-strain, temperature, vibration, or pressure of the FBG transducer attached to a structure, wherein the unit is mounted on the structure.

In one embodiment, the sensor interrogation unit of the present invention requires an electrical power budget for the interrogation unit that is equal to or less than 0.5 amp, allowing use of a USB communications port to provide power to the unit.

The sensor interrogation unit of the present invention is configured for monitoring of stress-strain, temperature, vibration, acoustic-emission, or ultrasound. In one embodiment, the interrogation unit is characterized by the capability of interrogating a status of any array of commercially available FBG transducers embedded or surface mounted on a structure like a rotor motor.

Some aspects of the invention provide a method of monitoring the status of FBG transducers, comprised of embedding or surface mounting a multi-channel fiber Bragg-grating sensor interrogation unit on military ordnance, wherein the interrogation unit includes at least one integrated optic sensor microchip and a signal processing IC-electronics unit that is packaged in a single-fiber, telecommunications-grade, hermetically-sealed, 2-cm×5-cm small form factor (SFF) package.

Some aspects of the invention provide a method of monitoring a status of FBG transducers, comprising embedding or surface mounting a single or multi-channel fiber Bragg-grating sensor interrogation unit on military ordnance, wherein the interrogation unit comprises at least one integrated optic sensor microchip and a signal processing IC-electronics unit that is packaged in a single fiber, telecommunications grade, 5-cm×5-cm common form factor (CFF) package.

For purposes of summarizing the invention, certain aspects, advantages and novel features of the invention. have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as conceived or suggested herein without necessarily achieving other advantages as may be conceived or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Additional objects and features of the present invention will become more apparent and the invention itself will be best understood from the following Detailed Description of Exemplary Embodiments, when read with reference to the accompanying drawings.

FIG. 1 shows one embodiment of a hybrid integrated optic sensor (InOSense™) microchip of the present invention implemented as a on chip-on-submount (CoS) package device, in which:

FIG 1A shows a top view of the internal light path waveguide structures of the integrated optic sensor microchip having an edge mounted SLD light source and Pin photodetectors, the chip being connected to a single fiber for the bi-directional transmission of light for the interrogation or the FBG sensors, FIG. 1B is an enlarged view of the SLD light source coupled to the adiabatic mode adapter waveguide port, FIG. 1C is a top view of the Pin photodetector port having an adiabatic reflective taper structure and a WDM interference filter, FIG. 1D is a side view of the Pin photodetector port, the WDM interference filter and the photodetector channel amid the bulk structure of the InOSense microchip;

FIG. 2 shows an alternate embodiment of a hybrid integrated optic sensor microchip of the present invention based on hermetic sealed TO-Can package device, in which:

FIG. 2A is a top view of the hybrid integrated optic sensor internal light path waveguide, the edge mounted SLD light source and Pin photodetectors, the chip being connected to a single fiber for the bi-directional transmission of light for the interrogation of the FBG sensors, FIG. 2B is an enlarged view of the TO-Can SLD light source coupled to the adiabatic mode adapter waveguide port, FIG. 2C is a top view of the TO-Can Pin photodetector port showing the adiabatic reflective taper structure, the WDM interference filter and photodetector channel coupled to the adiabatic taper waveguide structures, FIG. 2D shows a side view of the TO-Can Pin photodetector port showing the position of the WDM interference filter with respect to the photodetector channel and the bulk structure of the InOSense™ microchip;

FIG. 3 shows an interference WDM (edge) filter for demodulation of FBG optical signals, in which:

FIG. 3A shows the spectrum of each of the WDM interference filters attached to the InOSense microchip with a wavelength separation of 10-nanometer between each filter, FIG. 3B shows the spectrum of one of the WDM interference filters in relation to the peak wavelength position of the FBG sensor;

FIG. 7 shows tapered waveguide Bragg gratings, in which:

FIG. 7A shows a reflective waveguide structure incorporating a wavelength selective waveguide Bragg grating of a constant period, FIG. 7B shows a reflective waveguide structure incorporating a wavelength selective waveguide Bragg grating of a chirped period;

FIG. 8 shows a miniature single fiber FBG-Transceiver in which:

FIG. 8A shows a FBG-Transceiver™ package that uses Cos components,

FIG. 8B shows a FBG-Transceiver™ package that uses hermetic sealed TO can components;

FIG. 9 shows an InOsense™ microchip using GRIN adiabatic mode taper waveguide structures, in which:

FIG. 9A shows the light source mode adapter taper structure,

FIG. 9B shows the photodetector beam expanding taper structure, and

FIG. 9C shows a top view of the InOsense microchip showing the light source mode adapter waveguide, and the photodetector reflective taper waveguide structure;

FIG. 10 shows an arrayed waveguide-grating (AWG) layout of a 40-bands spectral 100 GHZ filter in which:

FIG. 10A shows the AWG waveguide structure layout with the input and output waveguide ports having the phase array waveguide layout, FIG. 10B shows the interference filter spectral output of the AWG waveguide structure.

DETAILED DESCRIPTION OF EXEMPLARY EMBODIMENTS

The preferred embodiments of the invention described herein relate particularly to single channel or multi-channel fiber Bragg grating (FBG) interrogation systems and manufacture thereof. While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Fiber Bragg-Grating Sensor Interrogation Unit

The invention relates to a one or more channel fiber Bragg-grating sensor interrogation unit ("FBG-Transceiver System") that uses integrated optic sensor (InOSense) microchip technology as an optical bench to integrate the key functionality of all passive and active optoelectronics components of conventional FBG interrogation systems such as the light guides, splitters and couplers, light source, photodetectors, WDM filters, FBG sensor signal demodulators, in combination with advanced signal processing IC-electronics all incorporated in a miniaturized, low power operation, telecommunications standard, hermetically sealed 2-cm×5-cm SFF single fiber package.

The fiber Bragg grating sensor interrogation ("FBG-Transceiver") technology (developed by Redondo Optics Inc., Redondo Beach, Calif.) is a promising structural health monitoring technology. Fiber Bragg grating sensor technology is commonly used for nondestructive health evaluation (NHE) and structural health monitoring (SHM) of advanced structures because of its light weight, micron-size transducers, and immunity to electromagnetic interference, it can be easily cast, embedded, or surface mounted on a structure. In addition, it offers the ability to distribute multiple sensors on a single fiber strand. However, a major drawback of the current FBG sensor technology is that today's commercially available FBG sensor interrogation systems are bench-top laboratory instruments that are too bulky and heavy to be permanently installed in structures where small size, low weight, and low power are critical for operation, for example, a tactical missile.

The FBG-Transceiver system uses a multi-channel integrated optic sensor (InOSense) microchip technology that allows the integration of all of the functionalities, both passive and active, of conventional bench top fiber Bragg grating (FBG) sensor interrogators such as the IFOS system. It features a compact, hermetically sealed 2-cm×5-cm small form factor (SFF) package with no moving parts. In addition, its lightweight design, energy efficiency, and operation at signal rates from direct current (DC) to 5 MHz, are microprocessor-controlled using signal processing electronics for the FBG sensors calibration and temperature compensation. It also offers the ability to either temporarily stored the process FBG sensor data in its 1 Gb built-in flash memory chip, or transmitted via USB, Ethernet, or wireless data communication networks connected to a remote control station.

In one embodiment, the FBG-Transceiver unit uses the principle of wavelength division demultiplexing (WDDM), commonly used in WDM (wavelength division multiplexing) telecommunication networks, to separate each of the FBG sensor signals and interrogate the status. of each of the individual sensors in an array of (about 1 to 40) FBG transducers distributed along a single optical fiber in real time. The principle of operation of an FBG sensor is based on the environmentally induced wavelength shift of the active peak wavelength of the grating, associated with changes in stress-strain, temperature, vibration, pressure, etc., of the grating attached to the structure. This invention uses a passive demodulation technique, based on WDM interference filters, in which the wavelength encoded optical signature of each of the FBG transducers in the array is transformed to an electric signal at each of the photo receivers by means of the bandpass optical properties of the interference filter.

The transformed electrical signal carrying the information from each of the FBG sensors is processed by a microprocessor controller mounted on a PC board equipped with conventional flash memory data storage and data transmission elements such as those from USB, Ethernet, wireless, or Bluetooth. The complete electrical power budget for the FBG-Transceiver unit is estimated at approximately $\leq 0.5$ amp, allowing the use of the same USB communications port to provide power to the unit. The low power consumption of the FBG-Transceiver unit also allows the use of a build-in battery to power the device. The complete InOSense microchip and signal processing IC-electronics unit is packaged in a single fiber, telecommunications grade, hermetically sealed 2-cm×5-cm small form factor (SFF) package, to produce a miniature multi-channel FBG-Transceiver system that can be used to monitor the status of FBG transducers embedded or surface mounted on current and future military ordnance such as tactical missile solid state rocket motors.

We, at Redondo Optics Inc., Redondo Beach, Calif., developed a single channel, low power, FBG-Transceiver™ system in a 1×2 cm DIL package form factor, wherein the single channel system comprises an active PIN diode with WDM filter, a reference power monitoring PIN diode, a superluminescence light emitting diode, and a single fiber bi-directional signal transmission that are all connected to and processed by an InOSense™ microchip.

Some aspects of the invention provide a multi-channel FBG-Transceiver unit that is capable of interrogating the status of any array of commercially available FBG transducers embedded or surface mounted on rotor-motor-like simulated structure. The multi-channel FBG-Transceiver prototype is configured to operate in the 1520-nm to 1570-nm wavelength range. Although other telecommunication standard wavelength allocations including the about 1310-nm window and the 800-900-nm window can be readily allocated since optoelectronic components, light source and detectors, are commercially readily available.

Optical fiber communications typically operate in a wavelength region corresponding to one of the following "telecom windows":

The first window at 800-900 nm was originally used. GaAs/AlGaAs-based laser diodes and light-emitting diodes (LEDs) served as senders, and silicon photodiodes were suitable for the receivers. However, the fiber losses are relatively high in this region, and fiber amplifiers are not well developed for this spectral region. Therefore, the first telecom window is suitable only for short-distance (<1-km) transmission.

The second telecom window utilizes wavelengths around 1.3 μm, where the fiber loss is much lower and the fiber dispersion is very small, so that dispersive broadening is minimized. This window was originally used for long-haul transmission. However, fiber amplifiers for 1.3 µm (for example, based on praseodymium-doped glass) are not as good as their 1.5-µm counterparts based on erbium, and zero dispersion is not necessarily ideal for long-haul transmission, as it can increase the effect of optical nonlinearities.

The third telecom window, which is now very widely used, utilizes wavelengths around 1.5 µm. The fiber losses are lowest in this region, and erbium-doped fiber amplifiers are available which offer very high performance. Fiber dispersion is usually anomalous but can be tailored with great flexibility (dispersion-shifted fibers).

The current single channel or multi-channel FBG-Transceiver unit has a spectral wavelength resolution of better than 5-pm, and it would obtain data at a rate ranging from DC to 20 kHz. One aspect of the invention relates to the data acquisition rate of the unit at a rate ranging from 20 kHz to 5 MHz frequencies. The FBG-Transceiver prototype of the invention is packaged in a 2 cm×5 cm small-form-factor (SFF) single fiber connector package, weighing less than 0.1 ounce, and would operate at an approximate power of 0.5 amp. It is known that the USB serial port is capable of delivering power up to 0.5 amp to the electronics board. The FBG-Transceiver prototype uses a serial USB port for data transmission to a remote computer control station, as well as for powering the device.

Hybrid Integrated Optic Sensor Microchip Technology

Figure 1:
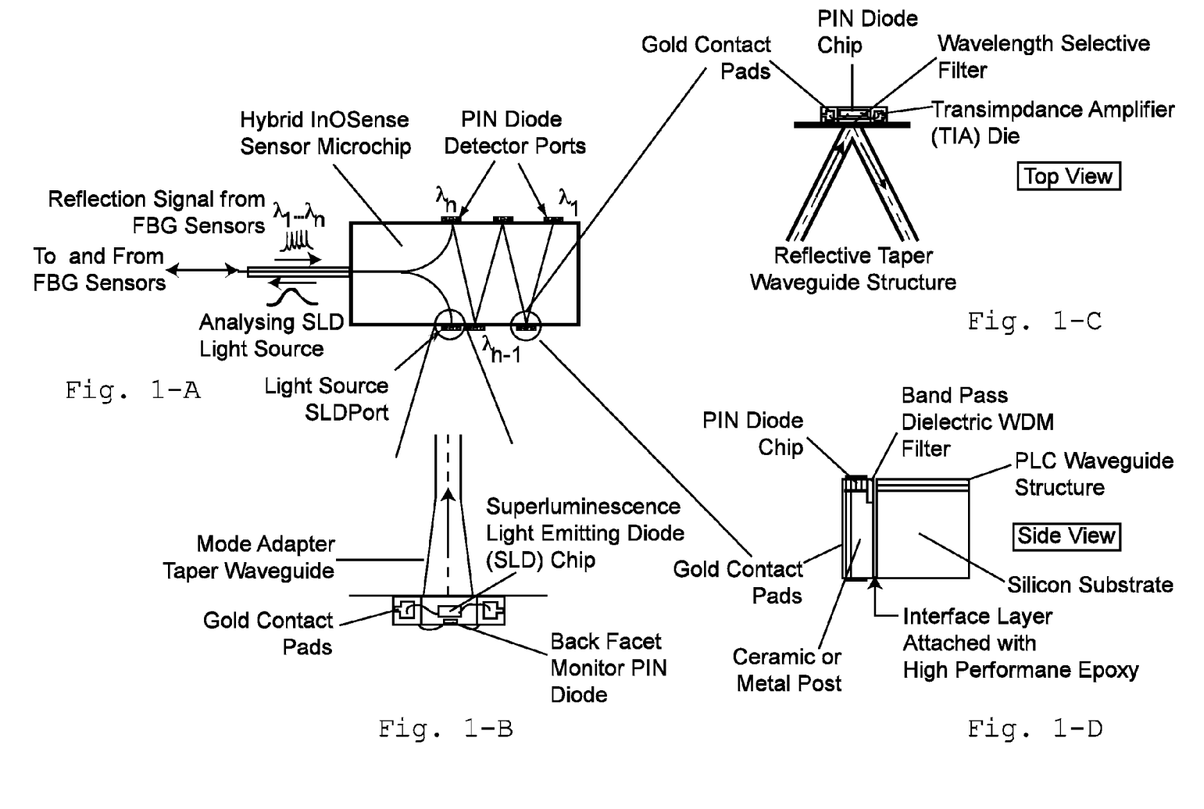
Figure 2:
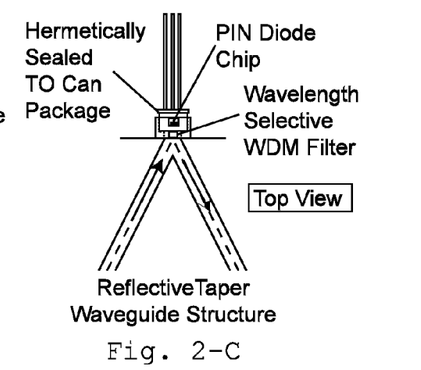

The fiber Bragg grating sensor interrogator (FBG-Transceiver) system uses hybrid integrated optic sensor (InOSense) microchip technology (developed by Redondo Optics Inc., (ROI) Redondo Beach, Calif.) as an optical bench platform to integrate all of the key components of the FBG read-out system, as shown in FIG. 1. The FBG-Transceiver system is based on the principle of wavelength division demultiplexing (WDDM) using the telecommunication wavelength allocation standards to simultaneously, and in real time interrogate the status of each of the individual FBG sensors distributed in the fiber sensor array. FIG. 1 shows that the light source and detectors are on a chip on submount (CoS) package and the complete FBG-Transceiver device needs to be on a hermetic sealed package. In other cases, when the active devices are packaged all ready on a hermetic sealed packaged like a small TO can package (as shown in FIG. 2), the FBG-Transceiver package does not need hermetic sealing. The InOSense microchip designs shown in FIG. 1 or FIG. 2 can use either CoS or TO can package components.

In its simplest form, the InOSense microchip integrates a temperature and power stabilized broadband (~100 nm), 850-nm, 1300-nm, or 1550-nm superluminescent light emitting diode (SLD) semiconductor chip mounted on a ceramic post that is structurally attached to the PLC microchip to illuminate and interrogate the status of each of the FBG transducers distributed along the sensing fiber. At the coupling interface between the PLC chip and the SLD source, ROI uses an "adiabatic taper" waveguide technology to produce a mode adapter that maximizes the light coupling efficiency from the SLD source to the guiding waveguide structure. Using this tapered waveguide design, light coupling efficiencies on the order of 50% can be achieved, comparable to other light coupling systems that require complex alignment and expensive aspheric lenses. The SLD source is guided internally through the PLC microchip, using waveguide structures, and couple to the sensing fiber that connects to the FBG-Transceiver SFF package.

Figure 7:
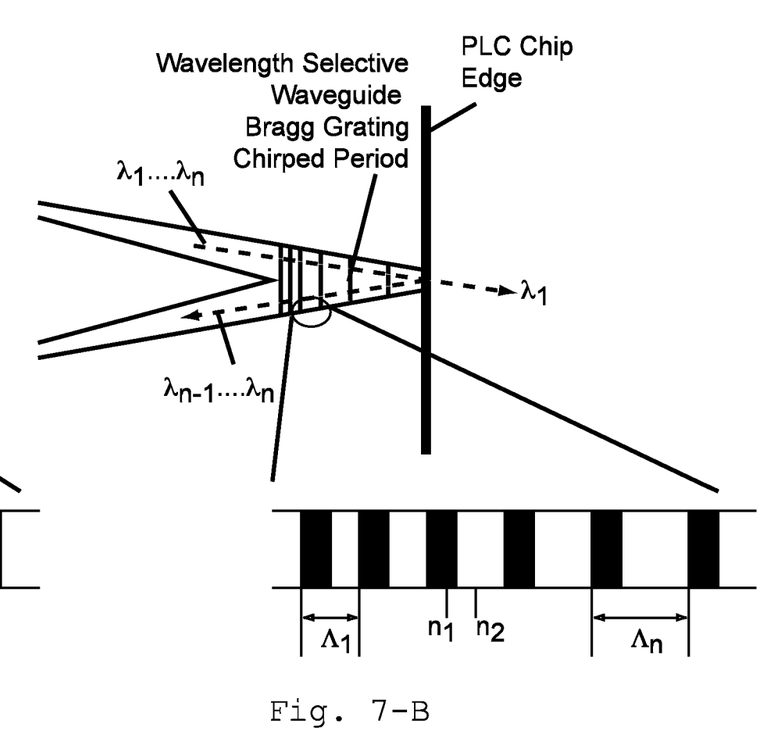

FIG. 7 shows tapered waveguide Bragg gratings for doing the FBG demodulation. A Tapered waveguide Bragg grating (TWBG) filter consists of a periodic variation in the refractive index along the light propagation path of the reflective tapered waveguide structure of the integrated optic microchip. The grating periodicity controls the reflected, or transmitted, wavelength spectrum of the grating via the following relationship:

$$\lambda_B = 2 n_{eff} \Lambda$$

Where $\lambda_B$ is the reflected wavelength of the grating, $n_{eff}$ is the efficient refractive index of the waveguide, and $\Lambda$ is the periodicity of the grating. Typically, the grating period about 500-nm for the ITU 1550 wavelength spectrum is directly written in the photomask used in the lithographic production of the integrated optic waveguide structures. FIG. 7 shows the tapered waveguide Bragg grating structure. Two types of tapered waveguide Bragg gratings can be used: 1) constant period grating, where the periodicity of the grating is constant, and 2) chirped period grating, where the periodicity of the grating gradually increases. The use of tapered waveguide Bragg gratings represents a manufacturing advantage over the use of thin film dichroic filters since the grating is written directly in the waveguide structure during fabrication of the waveguide, vs. the need to align and attach the thin filter to the waveguide structure after production and of the integrated optic chips Each fiber grating distributed along the sensing fiber reflects a portion of the SLD spectrum, determined by the Bragg condition of the grating, and transmits the remaining light to the next grating. The returned, wavelength encoded light signal from each of the distributed FBG sensors is received and processed by the InOSense microchip. The received light signal is guided internally through the microchip, using waveguide routing structures, to the individual PIN photodetectors assigned to monitor a specific wavelength from each of the distributed FBG transducers. A wavelength selective WDM interference optical filter, located in front of the PIN photodetector diodes, mounted at the edge of the microchip, allows the transmission of a selective FBG wavelength ($\lambda_1$) while reflecting all of the other ($\lambda_2, \lambda_3, \ldots \lambda_n$) FBG sensor wavelengths. This process is repeated, wavelength specific, at each PIN diode and achieving a wavelength separating PLC structure.

Figure 3:
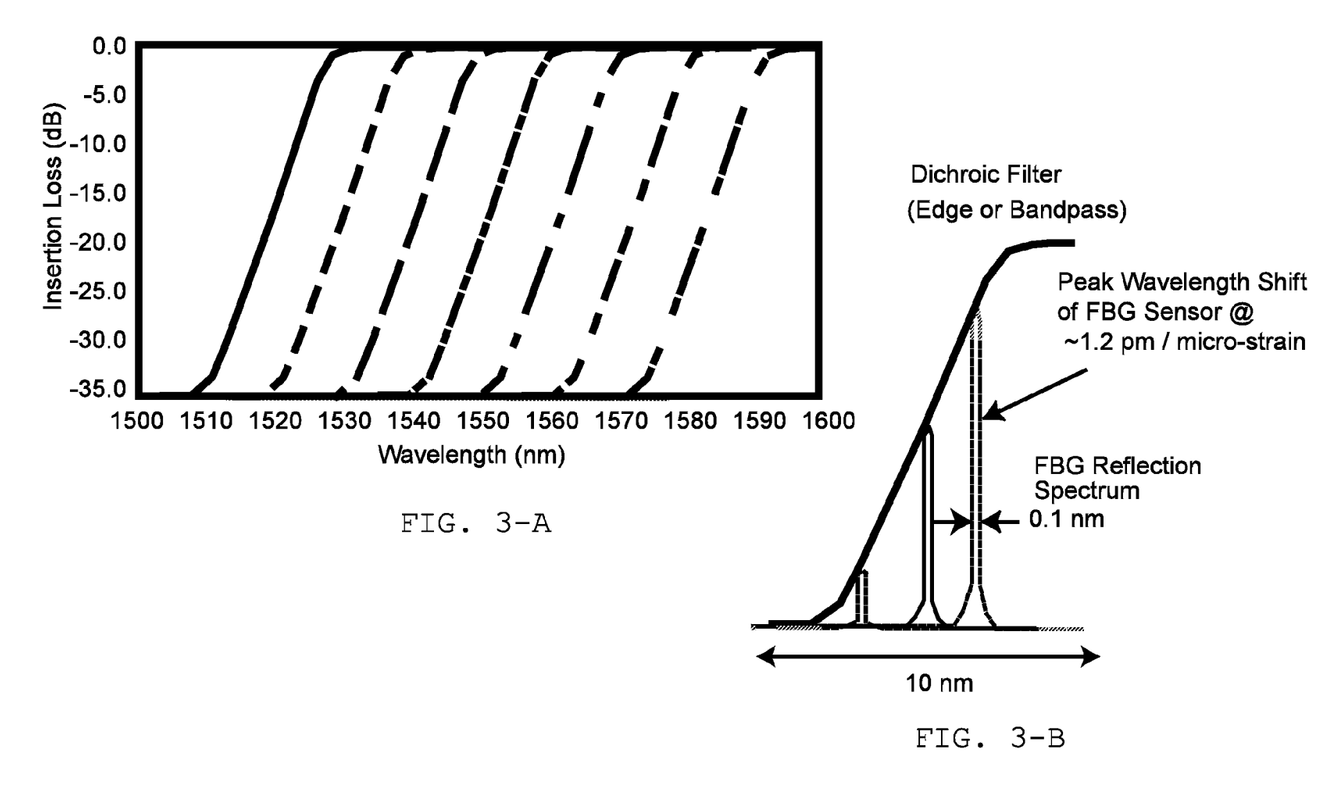

WDM interference filters are commonly used in WDM telecommunication networks to either mix (multiplex) or separate (demultiplex) large numbers of communication wavelengths, as shown in FIG. 3. WDM interference filters can be produced by a variety of methods including dielectric thin film filters, dichroic thin film filters, volume grating filters, volume holographic filters, Bragg thin film filters, and waveguide Bragg grating filters. By carefully selecting the spectral optical bandpass properties of the interference filter, the peak wavelength shift, environmentally induced, optical signal from each of the FBG sensors, is converted into a linear intensity variation, directly related to the physical state (peak wavelength position) of the sensor grating at the photodetector element. This principle forms the basis of the FBG sensor demodulator in the InOSense microchip. Interference WDM filters in the 1550-nm (C and L band) ITU grid work well as FBG demodulators with up to 10 FBG-transducers distributed in a fiber. For a larger number (40 to 60 sensors) of FBG-transducers on a single fiber strand, interrogation of the sensors can be accomplished by either introduction of 850-nm or 1310-nm interrogation wavelengths, or by using time division, or frequency division multiplexing techniques.

Figure 10:
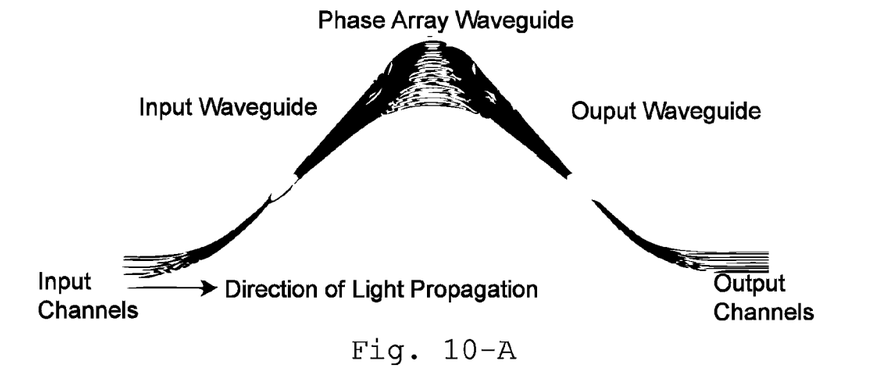

For reading a distributed FBG sensor array incorporating more than 12 FBG sensing elements, the received light signals from the FBG sensors are first demultiplexed into the individual wavelength signatures from each grating by an arrayed waveguide grating (AWG) planar lightwave structure. An AWG functions as a very narrow, highly selective spectral filter used to separate, or combine multiple wavelengths of light that are guided in the optical sensing fiber carrying the wavelength-encoded information from each FBG sensor element. The spectral filtering characteristics of the AWG can be designed to demultiplex the characteristic spectral signatures of each of the FBG sensor elements into its individual components. This unique feature allows the monitoring of multiple FBG sensor elements simultaneously and in real time, as shown in FIG. 10.

Figure 4:
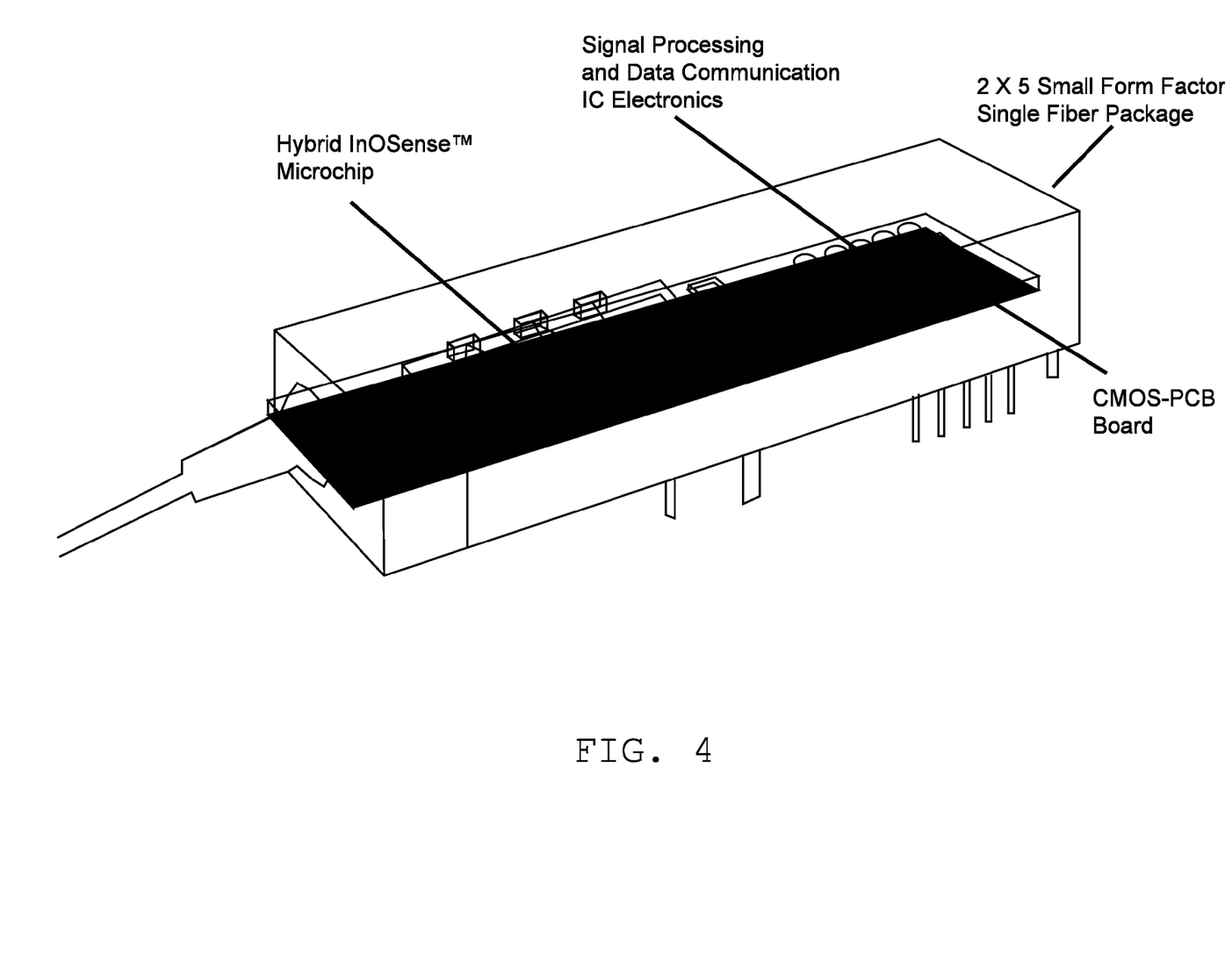
FIG. 4 shows an InOSense microchip surface mounted on a PCB board.

Once the FBG optical signature is demodulated and received at the PIN diode, a high-speed (DC to 10 MHz) transimpedance amplifier, mounted on the ceramic holder of the diode chip, amplifies the intensity signal at the PIN diode. The microchip with the integrated SLD and PIN diode elements mounts directly to a PC board using surface mount technology, as shown in FIG. 4. The PCB incorporates a programmable IC that integrates multi-channel switching, analog-to-digital (A/D) conversion, programmable logic to transform the intensity signal received at the detector to a physical measure and using look-up calibration tables, and USB data transmission. The processed data from the microprocessor can also be routed to either Ethernet, wireless, or Bluetooth data communications to a remote control station. Preliminary power budget evaluation estimates that the integrated system will require approximately $\leq 0.5$ amps of power that can be readily access via the USB communications port. The InOSense microchip and PCB electronics are all packaged on a standard, telecommunications grade, hermetically sealed 2-cm×5-cm small form factor (SFF) single fiber package to produce a miniature FBG-Transceiver unit to monitor the status of FBG transducers embedded or surface mounted on future ordnance such as tactical missiles.

Planar Lightwave Circuits

Planar lightwave circuit (PLC) technology has emerged as the new optical platform of choice for integration and large scale manufacturing of optical components. The technology draws on the excellent heat-dissipation and mechanical properties of silicon wafers. Optical component designers use the silicon substrate as an optical bench to integrate unpackaged optical components such as lasers, photodiodes, and micro-optic elements in die form onto the PLC chip and then re-package the chip in a single unit. Precise micro-machine features on the PLC chip allow the precise mechanical alignment and attachment of the different components, all accurate enough for reliable communication between the components and the outside world.

The optical communication between the components is accomplished by micron-size, optical waveguide circuits written on a thin film of glass deposited onto a silicon wafer. These waveguide circuits are used to guide light, in a manner similar to an optical fiber, through the chip, and perform passive (light guiding) and active (wavelength separation, wavelength filtering, light amplification, switching, modulation, etc.) functions in a manner similar to integrated electronic circuits. Today, high performance PLC chips, as with electronic IC microprocessors, are commercially produced using a variety of mass producible semiconductor technologies. The net result is the integration of sophisticated, multi-element photonic subsystems into mass-produced PLCs.

Compared to conventional bench-top FBG interrogation devices, the FBG-Transceiver system described in this invention has many advantages. These include: 1) no moving parts, or complex fiber optic connections to splitters, couplers, lasers and detectors, that are typically sensitive to motion, shock, vibration, and the moisture and temperature environment; 2) all components are integrated on a monolithic hybrid PLC chip, that surface mounts to a PCB electronics board, and is hermetically sealed in a 2-cm×5-cm small form factor (SFF) standard telecommunications package; 3) the FBG-Transceiver is produced using standard automated manufacturing practices common in the semiconductor IC and telecommunications components industries that translate into a low cost device allowing the possibility to be disposed when mounted on one time usage structure such as with every tactical missile test operation; and 4) uses standard data communications protocols that facilitates integration to any of the smart structure communication networks.

Figure 5:
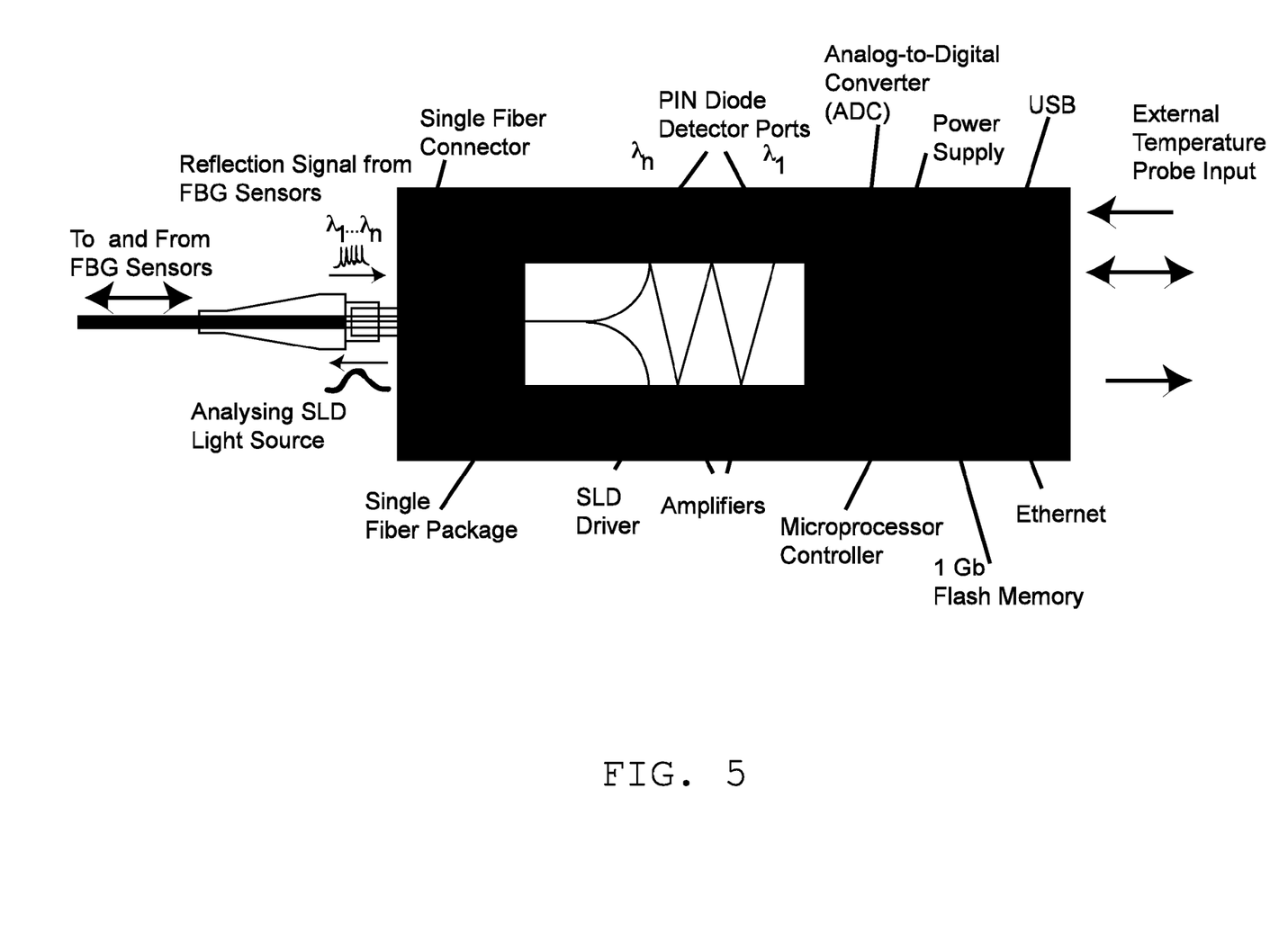
FIG. 5 shows one embodiment of a multi-channel fiber Bragg grating interrogation (FBG-Transceiver) system for illustration.

FIG. 5 shows one embodiment of hybrid planar lightwave circuit technology to integrate the functionalities of a fiber Bragg grating read-out system in a compact single fiber transceiver device. In particular, it illustrates the distributed fiber Bragg grating systems for monitoring of stress-strain, temperature, vibration, acoustic-emission, and ultrasound. an InOSense microchip based on ROI's planar lightwave circuit (PLC) technology that incorporates waveguide guiding structures such as splitters and beam combiners, and adiabatic taper mode adapters and reflective taper waveguide structures for enhancement of the coupling efficiency of the SLD to the PLC chip, and for the selective wavelength filtering and demodulation of the FBG sensor signals. The FBG-Transceiver InOSense microchip incorporates one waveguide port for a fiber input/output of the chip for the bidirectional transmission of signals back and forth from the FBG sensor, one waveguide port for the SLD light source, and five ports for five PIN diodes to receive and analyze the FBG sensor signals. The number of WDM demodulators and photo detector ports in the InOSense microchip depends on the desired number of FBG sensor channels incorporated in the FBG sensor fiber array to be interrogated by the FBG-Transceiver device.

Gradient Index Planar Lightwave Circuit (PLC) Process

Planar lightwave circuits (PLC) are optical devices typically fabricated using silicon or glass wafer processing technology. PLC's are typically fabricated on silicon, or glass, wafers using common semiconductor processes and materials, which make them attractive from a mass manufacturing and cost point of view. The predominant method is based on the chemical vapor deposition of silica onto silicon, commonly referred to as silica-on-silicon (SOS) technology. There is a variety of methods used in the production of SOS PLC structures including silica vapor deposition such as flame hydrolysis deposition (FHD), chemical vapor deposition (CVD), plasma enhanced chemical vapor deposition (PECVD), and liquid silica deposition via the sol-gel process, colloidal silica process, and spin-on-glass process. In this method, a series of silica films are deposited onto a silicon wafer to produce a three-layer waveguide structure: 1) bottom cladding or buffer layer, 2) a high index core layer, and 3) top cladding. After the bottom cladding and core glass layers are deposited, the wafer is heat treated to the consolidation temperature of the glass. The next step involves the use of high-resolution photolithographic techniques to define the waveguide structures on the surface of the film, followed by etching the waveguide channels. This step produces micrometer size square channels on the core layer of the device.

The dimension of the core waveguide structure depends on the refractive index contrast between the cladding layers and the core layer. For a refractive index contrast of 0.3%, the core waveguide is typically 8-micrometer square. As the index contrast increases the dimensions of the core waveguide decreases. The next step involves the deposition of the cladding layer, followed by complete glass densification of the device. Once the wafer is produced, the individual chips are diced and polished producing typically a set of 75 to 100 InOSense chips on a 4-inch wafer. The polish chip is then connected to the optical fibers and ready for use. For PLC's packaging, heat transfer and temperature control are two key factors that contribute to the design solution. Packaging plays a critical role in yield, cost and reliability of this technology.

ROI has developed its own well-established PLC fabrication method based on photosensitive spin-on-glass (PSOG) technology. ROI's PLC production method is similar to the SOS technology with two substantially different steps: 1) deposition of the silica film is achieved via a solution process, and 2) definition of the waveguide structure is achieved by an etchless direct lithography step. ROI's PSOG process allows the lithographic production of gradient index (GRIN) waveguide structures. GRIN waveguide structures enhance the performance of the InOSense chip since it allows the fabrication of three dimensional adiabatic, gradient variations of the refractive index along the propagation plane of the waveguide as well as in the horizontal and vertical planes, waveguide structures. The GRIN waveguide structures, in addition to conventional geometric taper structures produced using traditional etch based PLC manufacturing methods, can be used to produce taper mode adapters that can enhance the mode coupling efficiency from the SLD source to the waveguide, and also to produce the reflective taper structures used for the WDM wavelength separation and demodulation of the FBG sensor signals.

Adiabatic Mode Coupling Waveguide Structures

Figure 9:
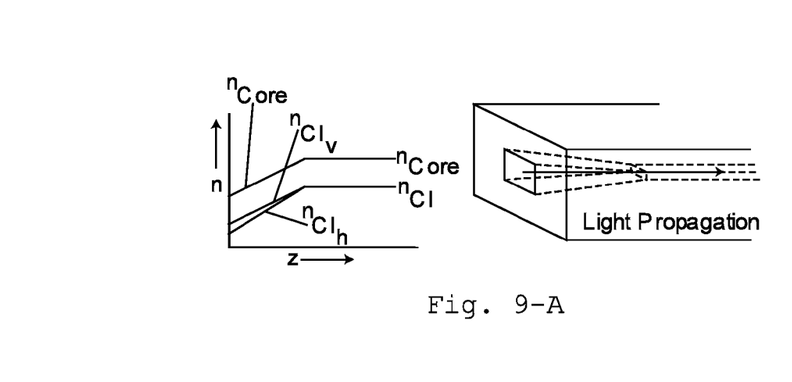

Adiabatic mode coupling waveguide structures allow the complete control of the light confinement strength along the light propagation axis of the waveguide structure. This is accomplished by either gradually increasing or decreasing the geometric dimensions ("geometric taper") of the PLC waveguide structure at any location in the two dimensional space along the light propagation path of the waveguide structure, or by controlling the refractive index ("refractive index taper") of the PLC waveguide structure at any location of the three-dimensional space of the waveguide, as shown in FIG. 9.

In the geometric transverse-transfer mode coupling structures, the geometric dimensions of the core waveguide are made to match the mode structure of the SLED light source imaged at the input port of the waveguide structure and progressively tapered to match the single mode condition of the light propagating waveguide structures in the integrated optic microchip. In the refractive index transverse-transfer mode coupling waveguide structures, the core and the surrounding vertical and horizontal cladding material each have a refractive index profile that is gradually controlled in the direction of light propagation. In this case, the refractive index of the core and cladding in the three dimensional space of the waveguide structure are made to match the mode structure of the SLED light source imaged at the input port of the waveguide structure and gradually change, or taper, the refractive index profile of the core and cladding to match the single mode condition of the light propagating waveguide structures in the integrated optic microchip.

For these types of structures, it is possible to tailor the velocity of light propagating through the core of the waveguide and the light confinement strength of the waveguide for any given cross section. Such waveguide structures can be used for mode matching an input or output of a high $\Delta n$ optical device, such as the SLD die, to the low $\Delta n$ of the PLC waveguide. They can also be used in the construction of reflective taper structures to maximize the coupling efficiency of incoming light reflected by the WDM interference mirror (filter) to a collection-tapered waveguide. Using this approach, complex adiabatic waveguide structures can be produced to achieve close to 100% efficiency of optical transfer power from an optical device to a two dimensional or three dimensional adiabatic mode coupling waveguide structure. These types of adiabatic structures are key to the design of the InOSense microchip and to maximize the power budget efficiency of the chip.

The Demodulation Principle of the FBG-Transceiver

The demodulation principle of the FBG-Transceiver is based on the bandpass properties of the edge interference filter. In this principle, the filter's edge has a characteristic slope design to cover the complete spectral range of the FBG sensor as a function of strain. The transmitted intensity signal through the filter is directly proportional to the position of the center peak wavelength of the FBG sensor. As the FBG sensor is strained, the center peak wavelength of the sensor shifts to either higher (tensile strain) or lower (compressive strain) wavelengths. This shift in peak position translates into higher or lower intensity readings at the photodetector, as the FBG spectral signature walks across the bandpass edge spectrum of the interference filter. A conventional FBG sensor operating in the 1550 nm spectral range has a wavelength shift of approximately 1.2 pm per micro-strain induced in the grating. The maximuim strain that an FBG sensor can withstand before catastrophic failure of the fiber is approximately 10,000 micro-strains. This translates to a total wavelength shift of 12 nm.

Thin film WDM filters are widely used today in WDM fiber optic networks for the telecommunications industry. When demultiplexing a relatively small number ($\leqq 12$) of FBG sensor channels, thin filters are the technique of choice because of its passive, no moving parts, function to separate and demodulate the FBG sensor signal that allows simple integration to the InOSense microchip. Specific technical advantages include micron-size dimensions, environmentally and thermally stable, superior optical properties including low insertion loss, wide pass band, small chromatic dispersion, and small polarization loss. For FBG sensing channels greater than 12, a AWG planar lightwave structure is the prefer wavelength demultiplexing method combined with either planar or bulk interference filters for demodulation of the wavelength encoded signature of the FBG sensors in the array.

At the heart of the FBG-Transceiver device are the WDM interference filters used to demultiplex and demodulate the FBG sensor signals. These filters allow light in a very narrow wavelength range, such as that of the reflected spectrum of an FBG sensor (about 0.1 nm), to transmit through the filter while reflecting lights in other spectral range. Cascading through different filters allows each of the individual FBG sensor signals to be dropped at the specific PIN photodetector. Thin film filters operate on the same principle as a Fabry-Perot interferometer. They are made of thin film layers of a dielectric material with alternating high and low refractive indices. The minimal structure that is required to give rise to the bandpass filter functionality is referred to as the cavity, i.e., Fabry-Perot cavity, which is the building block for most filter designs. The number of cavities used and the optical thickness (i.e., physical film thickness multiplied by the index of refraction of each of the individual layers in the filter structure) determine the filter bandpass shape or optical performance.

Superluminescence Light Emitting Diode (SLD) Subassembly

SLD Subassembly consists of an InP edge-emitting, single-mode, 1550-nm superluminescent light emitting diode chip, 10-milliwatts of power, mounted on a chip-on-submount (CoS) ceramic substrate, obtained from a major laser diode manufacturer, such as DenseLight, Exalos, InPhenix, Q-Photonics, or Kamelian, that is currently involved in the manufacturing of SLD diode assemblies for the telecommunications market. The SLD diode subassembly interfaces with the InOSense microchip, as shown in FIG. 1 and FIG. 5, to demonstrate the efficient coupling of optical power from the SLD chip to the waveguide structure. Alternatively, the SLD can be also obtained in a miniature, hermetically sealed, TO can package that mounts on a stainless steel or ceramic package that readily attaches to the InOSense microchip structure as shown in Figure (new figure see notes).

PIN Photodiode Subassembly

PIN photodiode subassembly consists of a digital PIN photodiode chip mounted on a chip-on-submount (CoS)) ceramic substrate obtained from a photodetector manufacturer, such as Hitachi, LuxNet, ArchCom, Emcore-Ortel, or Luminent. The PIN diode subassembly will be designed to incorporate the TIA mounted in close proximity to the diode to cancel any high frequency electrical noise interference generated from the laser diode subassembly. The PIN photodiode subassembly also incorporates the WDM interference filter. Alternatively, the PIN photodiodes can be also obtained in a miniature, hermetically sealed, TO can package that mounts on a stainless steel or ceramic package that readily attaches to the InOSense microchip structure as shown in FIG. 2.

Signal Processing Electronics

Figure 6:
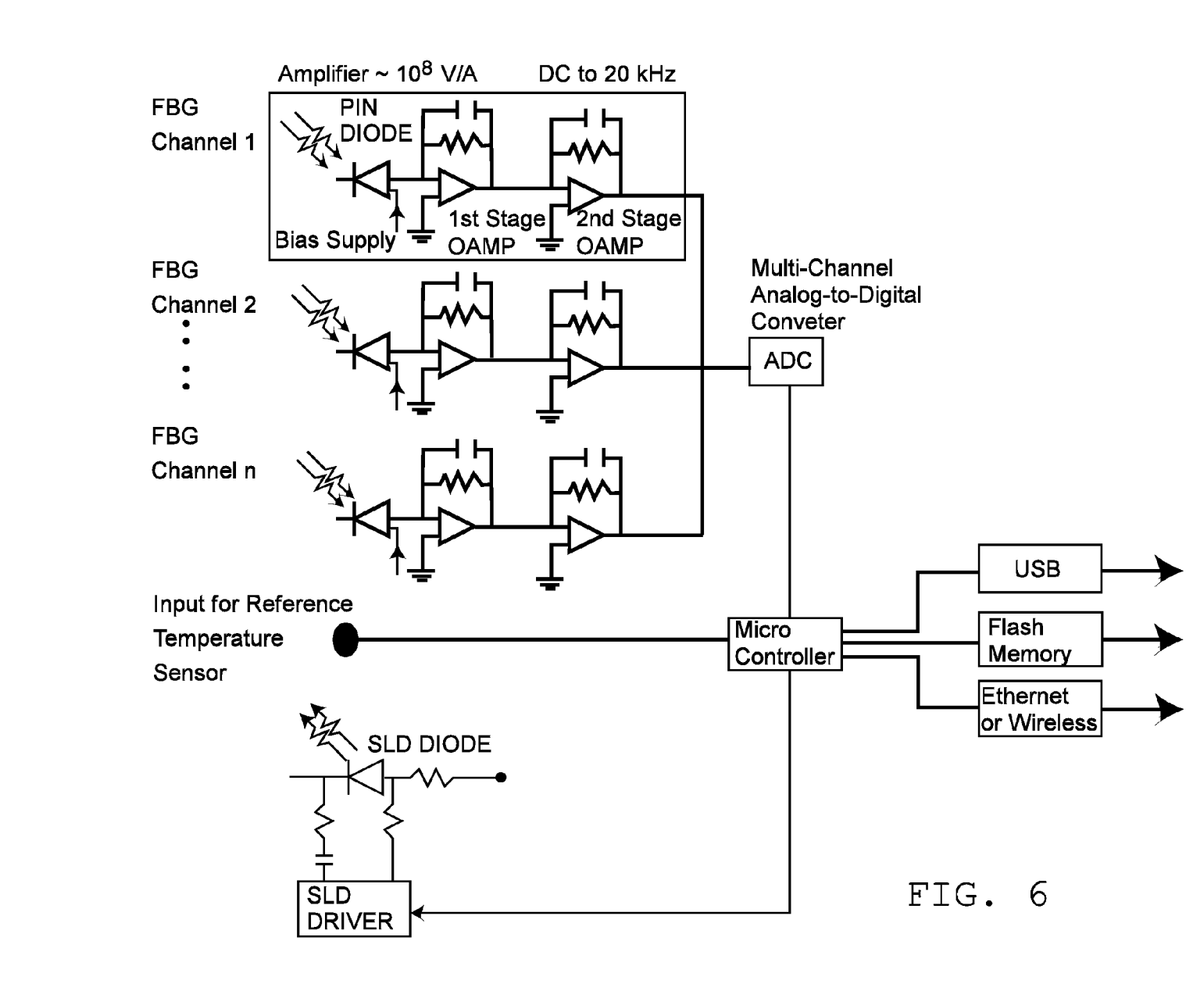
FIG. 6 shows a schematic diagram of the FBG-Transceiver signal processing electronics.

A schematic diagram of the signal processing electronics is shown in FIG. 6. The system consists of a broadband, temperature stabilized, superluminescence light emitting (SLD) diode operating in a DC mode, which is used to interrogate the status of the FBG transducers, and an array of PIN diode detectors, each assigned to a interrogate the optical signal of a specific FBG transducer.

The optically demodulated signal detected by the PIN diodes is amplified by a dual stage, high-bandwidth/high-gain, optical amplifier system covering frequencies from DC to 5 MHz and gains of up to $10^8$ Volts/Watt. The system also incorporates automatic temperature compensation by using an independent temperature sensor input port. The signals processed by the amplifiers are then fed into a multi-channel, high-speed, analog-to-digital converter (ADC), and then transmitted to a programmable microprocessor. The microprocessor incorporates predetermined calibration lookup tables to convert the demodulated optical signal from the FBG transducers to a physical measurement, such as strain-stress, vibration and acoustics frequency, etc. The output of the processed FBG sensor data generated by the microprocessor can be temporarily stored in a 1 Gb flash memory chip, or transmitted in real time via the serial USB port, Ethernet, or wireless data communications. The data transmission mode will be determined based on the established data transmission communication networks in, for example, a naval vessel. The electronics board will be powered via the USB serial port, capable of delivering power up to 0.5 amp. A graphical mode LabView software interface will be implemented to display the status of each of the FBG transducers in the sensor array in real time.

Figure 8:
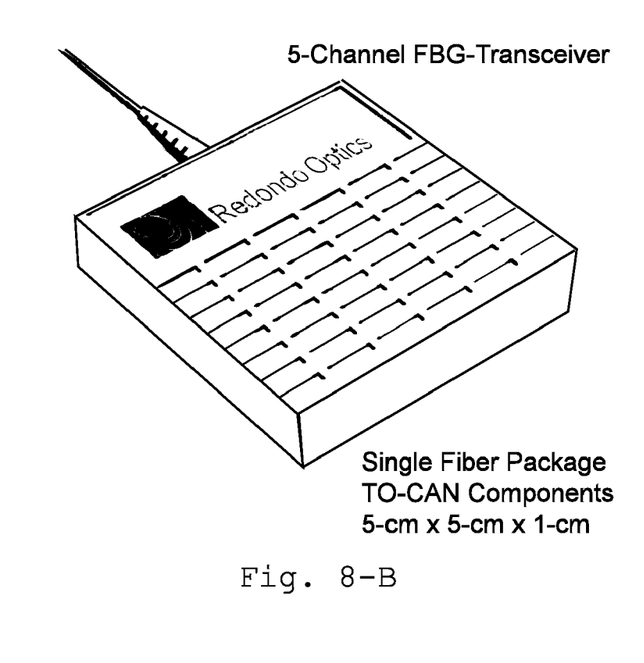

As disclosed above, the FBG-Transceiver components can be packaged in a telecommunications standard, hermetically sealed 2-cm×5-cm small form factor (SFF) single fiber package. The complete package would then be hermetically sealed to produce a FBG-Transceiver device that is environmentally robust and capable of operating at temperatures in the range of −40° C. to 85° C. and relative humidity in the range of 0% RH to 100% RH. The FBG transducers would then be exposed to a series of compressive and tensile strain conditions in the range of 0 µstrain to 10,000 µstrains. Alternatively, if the active optoelectronic components are already mounted on a hermetic sealed package like a TO can, then the FBG-Transceiver package does not require hermeticity packaging to reliably operate in high demanding environments. FIG. 8 shows an FBG-Transceiver™ assembled in a small-form-factor (SFF) package that uses (a) CoS components and (b) CFF package that uses TO can components. One aspect of the invention relates to the use of all ready hermetic sealed components (TO can package) to produce a 5×5 common factor single fiber FBG-Transceiver device.

One aspect describes the sensor interrogation unit of the present invention comprising a broad band interference filter for demodulation of the FBG sensor wavelength encoded signal associated with static events such as stress, strain, temperature, vibration, pressure, etc. in the range from DC to 20 KHz, and a narrow band interference filter for demodulation of the FBG sensor wavelength encoded signal associated with dynamic events such as acoustics and ultrasound in the range from 20 kHz to 5 MHz. The narrow band filter has a spectral bandwidth in the range of 0.001 nm to 1 nm. The broadband filter has a spectral bandwidth in the range of 1 nm to 20 nm.

From the foregoing description, it will be appreciated that a novel approach for the multi-channel fiber Bragg grating interrogation systems and manufacture thereof has been disclosed. While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the appended claims, including the full range of equivalency to which each element thereof is entitled.

What is claimed is:

1. A method of monitoring a plurality of FBG transducers distributed along a single optical fiber, comprising
    directly connecting to a single point of said single optical fiber an integrated optic sensor microchip having a planar waveguide structure including a plurality of ports located along the edges of said microchip waveguide;
    interrogating said FBG transducers with a broadband spectrum light source coupled to said fiber through one of said ports located along the edges of said microchip waveguide; and
    receiving at others of said ports located along the edges of said microchip waveguide the respective wavelength-encoded signatures of said FBG transducers in response to said interrogating.

2. The method of claim 1, wherein said microchip includes signal processing IC electronics and each of said ports is allocated to a corresponding one of said signatures.

3. The method of claim 2, further comprising configuring the integrated optic sensor microchip and signal processing IC-electronics unit to operate in the 1520-nm to 1570-nm wavelength range.

4. The method of claim 2, further comprising configuring the integrated optic sensor microchip and signal processing IC-electronics unit to operate in the 1310-nm telecommunication wavelength range.

5. The method of claim 2, further comprising configuring the integrated optic sensor microchip and signal processing IC-electronics unit to operate in the 800-nm to 900-nm telecommunication wavelength range.

6. The method of claim 2, wherein the integrated optic sensor microchip and signal processing IC-electronics unit has a spectral wavelength resolution of better than 5-pm.

7. The method of claim 1, wherein the data acquisition rate of said interrogating ranges from DC to 20 kHz.

8. The method of claim 1, wherein the data acquisition rate of said interrogating ranges from 20 kHz to 5 MHz.

9. The method of claim 2, wherein the electrical power budget for said integrated optic sensor microchip and signal processing IC-electronics unit is equal to or less than 0.5 amp.

10. The method of claim 2, wherein said allocating of said ports to said signatures comprises includes allocating a WDM interference filter at certain of said ports, said WDM filter having a pass-band respective to the optical signature of each of said FBG transducers.

11. The method of claim 1, wherein said interrogating comprises transmitting optical signals to and from said FBG array and demodulating the wavelength-encoded signal from the FBG sensor to an electrical signal as a function of the environmental state of the FBG array.

12. A method of monitoring the status of a plurality of FBG transducers distributed along a single optical fiber, comprising having directly connected to a single point of said single optical fiber an integrated optic sensor microchip having a planar waveguide including a plurality of ports located along the edges of said microchip waveguide;

applying through one of said ports located along the edges of said integrated optic sensor microchip integrated planar waveguide a broad band spectrum light to interrogate said FBG transducers; and receiving at others of said ports located along the edges of said microchip waveguide the respective wavelength-encoded signatures of said FBG transducers in response to said applying of said broadband spectrum light.

* * * * *